(12) United States Patent
Dettinger et al.

(10) Patent No.: US 7,734,646 B2
(45) Date of Patent: Jun. 8, 2010

(54) DATA MODEL SIMPLIFICATION THROUGH FIELD FALLOUT

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 1627 days.

(21) Appl. No.: 10/353,666

(22) Filed: Jan. 29, 2003

(65) Prior Publication Data

US 2004/0148276 A1    Jul. 29, 2004

(51) Int. Cl.
G06F 7/00 (2006.01)
G06F 17/30 (2006.01)
G06F 3/00 (2006.01)

(52) U.S. Cl. .................................. 707/779; 715/744
(58) Field of Classification Search .................... 707/3; 345/792
See application file for complete search history.

(56) References Cited

U.S. PATENT DOCUMENTS

| | | | | |
|---|---|---|---|---|
| 5,802,518 A | * | 9/1998 | Karaev et al. | 707/9 |
| 5,864,871 A | * | 1/1999 | Kitain et al. | 707/104.1 |
| 6,571,234 B1 | * | 5/2003 | Knight et al. | 707/3 |
| 6,684,369 B1 | * | 1/2004 | Bernardo et al. | 715/513 |
| 6,725,227 B1 | | 4/2004 | Li | |

OTHER PUBLICATIONS

Dettinger et al., IBM U.S. Appl. No. 10/083,075, filed Feb. 26, 2002, "Improved Application Portability and Extensibility Through Database Schema and Query Abstraction", pp. 28.

Dettinger et al., IBM U.S. Appl. No. 10/083,075, filed Feb. 26, 2002, "Improved Application Portability and Extensibility Through Database Schema and Query Abstraction", pp. 13.

* cited by examiner

Primary Examiner—Apu M Mofiz
Assistant Examiner—Susan Y Chen
(74) Attorney, Agent, or Firm—Patterson & Sheridan, LLP

(57) ABSTRACT

The present invention generally provides methods, articles of manufacture and systems for simplifying a query building process by limiting the number of fields presented to a user for building queries. The number of fields presented to the user may be limited by hiding one or more logical fields from the user based on usage characteristics. For example, a logical field that is rarely used or has not been used within a predetermined period of time may be hidden from the user. For some embodiments, a fallout manager may monitor the use of logical fields in building queries, update usage characteristics, and mark logical fields as hidden based on the usage characteristics. A graphical user interface may not present to a user logical fields that have been marked as hidden.

7 Claims, 7 Drawing Sheets

| DATA REPOSITORY ABSTRACTION | 132 |
|---|---|
| CATEGORY = CONTACTS | CATEGORY = BIRTH AND AGE |
| FIELD = FIRST NAME<br>ACCESS = SIMPLE<br>TABLE = CONTACTS<br>COLUMN = F_NAME<br>HIDDEN = NO<br>LAST USE = 2 DAYS | FIELD = BIRTH DATE<br>ACCESS = SIMPLE<br>TABLE = CONTACT<br>COLUMN = BIRTH<br>HIDDEN = YES<br>LAST USE = 282 DAYS |
| FIELD = LAST NAME<br>ACCESS = SIMPLE<br>TABLE = CONTACTS<br>COLUMN = L_NAME<br>HIDDEN = NO<br>LAST USE = 4 DAYS | FIELD = AGE IN YEARS<br>ACCESS = COMPOSED<br>TABLE = CONTACT<br>EXPRESSION =<br>YEARS(CURRENT_TIME-BIRTHDATE)<br>HIDDEN = YES<br>LAST USE = 282 DAYS |
| FIELD = CITY<br>ACCESS = SIMPLE<br>TABLE = CONTACT<br>COLUMN = STREET<br>LAST USE = 10 DAYS | |

*FIG. 2B*

| SCHEDULING ALGORITHMS | 135 |
|---|---|
| NAME = ALGORITHM 1<br>TYPE = LEAST RECENTLY USED<br>SCHEDULE = 180 DAYS<br>RESULT = PARTIAL FALLOUT | NAME = ALGORITHM 2<br>TYPE = LEAST RECENTLY USED<br>SCHEDULE = 365 DAYS<br>RESULT = COMPLETE FALLOUT |

*FIG. 2C*

| FALLOUT INFORMATION | 138 |
|---|---|
| CATEGORY=CONTACT | CATEGORY=BIRTH AND AGE |
| FIELD=STREET<br>ACCESS=SIMPLE<br>TABLE=CONTACT<br>COLUMN=STREET<br>HIDDEN=YES<br>LAST USE=1254 DAYS | FIELD=AGE IN DECADES<br>ACCESS=COMPOSED<br>EXPRESSION =<br>AGE IN YEARS/10<br>HIDDEN=YES<br>LAST USE=1354 DAYS |

*FIG. 2D*

ADD SEARCH CONDITION
USER : RESEARCHER 1
SEARCH : UNSAVED

530

CHOOSE ONE CONDITION CATEGORY AND VALUE AND CLICK NEXT. IF YOU KNOW THE ICD-9 OR DRG VALUE TO USE, TYPE IT IN AND CLICK NEXT TO CREATE THE CONDITION.

- ⦿ BIRTH AND AGE RELATED — [AGE ▼] — 532
  - AGE
  - BIRTH DATE
- ○ LABORATORY RESULTS — [DERIVED RESULTS ▼] — 534
- ○ REPORTS — [CARDIOLOGY ▼] — 536
- ○ DIAGNOSTIC USING ICD-9 — VALUE: [ ] [BROWSE] — 538

[NEXT] — 540    [CANCEL] — 542    544 — ☐ SHOW HIDDEN FIELDS

*FIG. 4A*

ADD SEARCH CONDITION
USER : RESEARCHER 1
SEARCH : UNSAVED

530

CHOOSE ONE CONDITION CATEGORY AND VALUE AND CLICK NEXT. IF YOU KNOW THE ICD-9 OR DRG VALUE TO USE, TYPE IT IN AND CLICK NEXT TO CREATE THE CONDITION.

- ⦿ BIRTH AND AGE RELATED — [AGE ▼] — 532
  - AGE
  - BIRTH DATE
  - AGE IN DECADES
- ○ LABORATORY RESULTS — [DERIVED RESULTS ▼] — 534
- ○ REPORTS — [CARDIOLOGY ▼] — 536
- ○ DIAGNOSTIC USING ICD-9 — VALUE: [ ] [BROWSE] — 538
- ○ CONTACT — [STREET ADDRESS ▼] — 539

[NEXT] — 540    [CANCEL] — 542    544 — ☑ SHOW HIDDEN FIELDS

*FIG. 4B*

DATA MODEL SIMPLIFICATION THROUGH FIELD FALLOUT

BACKGROUND OF THE INVENTION

1. Field of the Invention

The present invention generally relates to data processing and more particularly to simplifying the process of building database queries by limiting the number of fields presented to a user for building the database queries.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Queries are constructed of query conditions that serve to filter results returned from the query. Accordingly, a query may be thought of as group of filters put together to sift out only the data in which they are interested. Query conditions are typically constructed by specifying conditional operations on one or more fields in the targeted database. To facilitate query building, some applications may provide the user with a graphical user interface (GUI) presenting the user with a list of fields for use in specifying query conditions.

However, as the relative size and complexity of a data model increases, the number of fields presented to the user in the GUI may become unwieldy. In other words, the data model may easily grow beyond the ability for users to understand and use it. Typically, at least some of the fields presented in the GUI may be rarely (or never) used in building a query. By presenting these rarely used fields to the user, usability of the application targeting the data model suffers, as the GUI becomes too complex for the user to be able to see and understand how they might build a query to return desired data.

Accordingly, there is a need for an improved method for simplifying the query building process by limiting the number of fields presented to the user for building queries.

SUMMARY OF THE INVENTION

The present invention generally provides methods, articles of manufacture and systems for simplifying a query building process by limiting the number of fields presented to a user for building queries.

For some embodiments, a method of accessing data generally includes providing an interface allowing a user to build a database query based on a plurality of fields, monitoring use of the fields in building queries, and limiting fields presented to the user in the interface based on the monitored use of the fields in building queries.

For some embodiments, a method of providing access to data having a particular physical data representation generally includes providing an interface allowing a user to build a database query based on a plurality of logical fields corresponding to physical entities of the particular physical data representation, monitoring use of the logical fields in building queries, and limiting the logical fields presented to the user in the interface based on the monitored use of the logical fields in building queries.

For some embodiments, the article of manufacture generally includes a computer-readable medium containing a program which, when executed by a processor, performs operations for accessing data. The operations generally include providing an interface allowing a user to build a database query based on a plurality of logical fields mapped to physical entities of the particular physical data representation, monitoring use of the logical fields in building queries, and limiting the logical fields presented to the user in the interface based on the monitored use of the logical fields in building queries.

For some embodiments, the system generally includes a database, a data repository abstraction layer, a query building interface, and a fallout manager. The data repository abstraction layer may generally contain logical fields corresponding to physical entities of the database. The query building interface may be configured to allow a user to build a query to access the database by specifying query conditions based on the logical fields of the data repository abstraction layer. The fallout manager may be configured to control the logical fields presented by the query building interface based on usage characteristics of the logical fields in building queries.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 4A-4B are exemplary graphical user interface (GUI) screens for building a database query in accordance with the present invention.

DETAILED DESCRIPTION OF THE PREFERRED EMBODIMENTS

Figure 1:
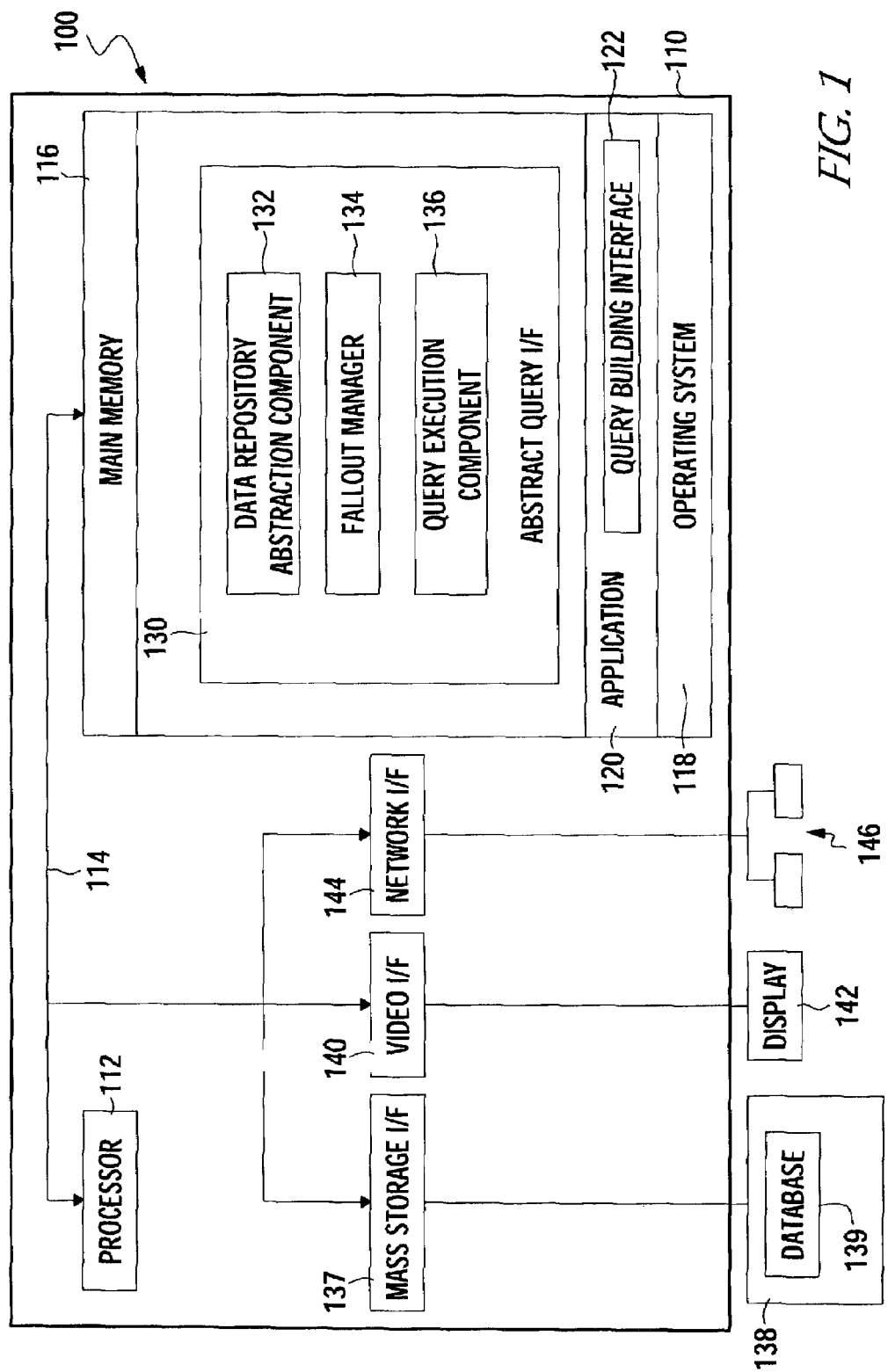
FIG. 1 is a computer system illustratively utilized in accordance with the present invention.

The present invention generally is directed to systems, methods and articles of manufacture for simplifying the building of queries for accessing data in a data repository by limiting the number of fields presented to a user based on usage characteristics of the logical fields. In some embodiments, a data repository abstraction (DRA) layer provides a logical view of the data repository that is independent of the particular manner of data representation. The DRA layer may be actively managed to hide or remove logical fields that are not accessed often (or are not accessed within a predetermined period of time). By hiding or removing logical fields from the DRA layer, the number of logical fields presented to a user in a query building interface may be limited, thus simplifying the query building process. Further, by removing logical fields from the DRA layer altogether, the size of the DRA layer and associated processing overhead may be reduced, thus improving performance.

As used herein, the term database generally refers to any collection of data, regardless of the particular physical representation (or "schema") and the terms database and data source may be used interchangeably. The term schema generically refers to a particular arrangement of data. In other words, a database may be organized according to a relational schema (accessible by SQL queries), an XML schema (accessible by XML queries), or any other schema presently known or to be developed. The term abstract query generally refers to a query composed of logical fields that may be mapped to physical entities of a database, regardless of a particular underlying physical representation. Embodiments of the present invention may be used to advantage when building abstract queries or conventional database queries. However, to facilitate understanding, embodiments of the present invention will be described below with reference to building abstract queries. Further, the abstract queries described below may target a medical industry database as a particular, but not limiting, application example.

One embodiment of the invention is implemented as a program product for use with a computer system such as, for example, the computer system 110 of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, the data processing environment 100 is shown. In general, the data processing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the networked devices 146. The display 142 may be any video output device for outputting viewable information. The networked devices 146 may be any combination of any type networked devices, such as networked servers, networked printers, and network accessed storage (NAS) devices.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, main memory 116 may be considered to include memory physically located elsewhere in a computer system 110, for example, any storage capacity used as virtual memory or stored on a mass storage device (e.g., DASD 138) or on another computer coupled to the computer system 110 via bus 114.

The main memory 116 is shown configured with an operating system 118. The operating system 118 is the software used for managing the operation of the computer system 110. Examples of the operating system 118 include UNIX, Microsoft Windows®, and the like. As illustrated, the main memory 116 further includes at least one application 120 and an abstract query interface 130.

The application 120 and the abstract query interface 130 are software products comprising a plurality of instructions that are resident at various times in various memory and storage devices in the computer system 110. When read and executed by one or more processors 112 in the computer system 110, the application 120 and the abstract query interface 130 cause the computer system 110 to perform the steps necessary to execute steps or elements embodying the various aspects of the invention. The application 120 (and more generally, any requesting entity, including the operating system 118) is configured to run (i.e., issue/execute) queries against the database 139.

The queries issued by the application 120 may be created and/or specified by a user via a query building interface 122, which may be included with the application 120. The queries (referred to herein as "abstract queries") are composed using logical fields defined by the abstract query interface 130. The query building interface 122 may allow the user to generate abstract queries by specifying query conditions, based on the logical fields, to be added to the abstract queries. The logical fields used in the abstract queries are defined by a data repository abstraction (DRA) component 132 of the abstract query interface 130. The abstract queries are executed by a runtime component 136 which transforms the abstract queries into a form consistent with the physical representation of the data contained in the database 139. The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety.

The abstract queries created by the query building interface 122 and executed by the runtime component 136 may be monitored by a fallout manager 134 of the abstract query interface 130. As will be described in greater detail below, the fallout manager 134 may be generally configured to modify the DRA component 132 by removing logical fields and/or marking logical fields as hidden, based on usage characteristics of the logical fields as detected in the monitored abstract queries. As previously described, by removing fields from the DRA component 132 and/or marking fields as hidden, the number of fields presented to a user, by the query building interface 122, for use in building an abstract query by query building interface 122 may be reduced, which may simplify the query building process.

Data Model Fallout

The fallout manager 134 may limit the number of fields presented to the user by allowing fields that have not been used recently (or are used infrequently) to "fall-out" of the DRA component 132. As used herein, the term fall-out generally refers to preventing a field from being presented to the user by either marking the field as hidden (referred to as "partial fall-out") in the DRA component 132 or removing the field completely from the DRA component 132 (referred to as "complete fall-out"). In the case of partial fall-out, a field is hidden from the user (e.g., not presented to the user in the interface), but still remains in the DRA component 132. In some cases, hidden fields may still be displayed, for example, upon user request. In the case of complete fall-out, the field is actually removed from the DRA component 132 and may not be displayed unless first restored to the DRA component 132, for example, by an administrator.

Figure 2A:
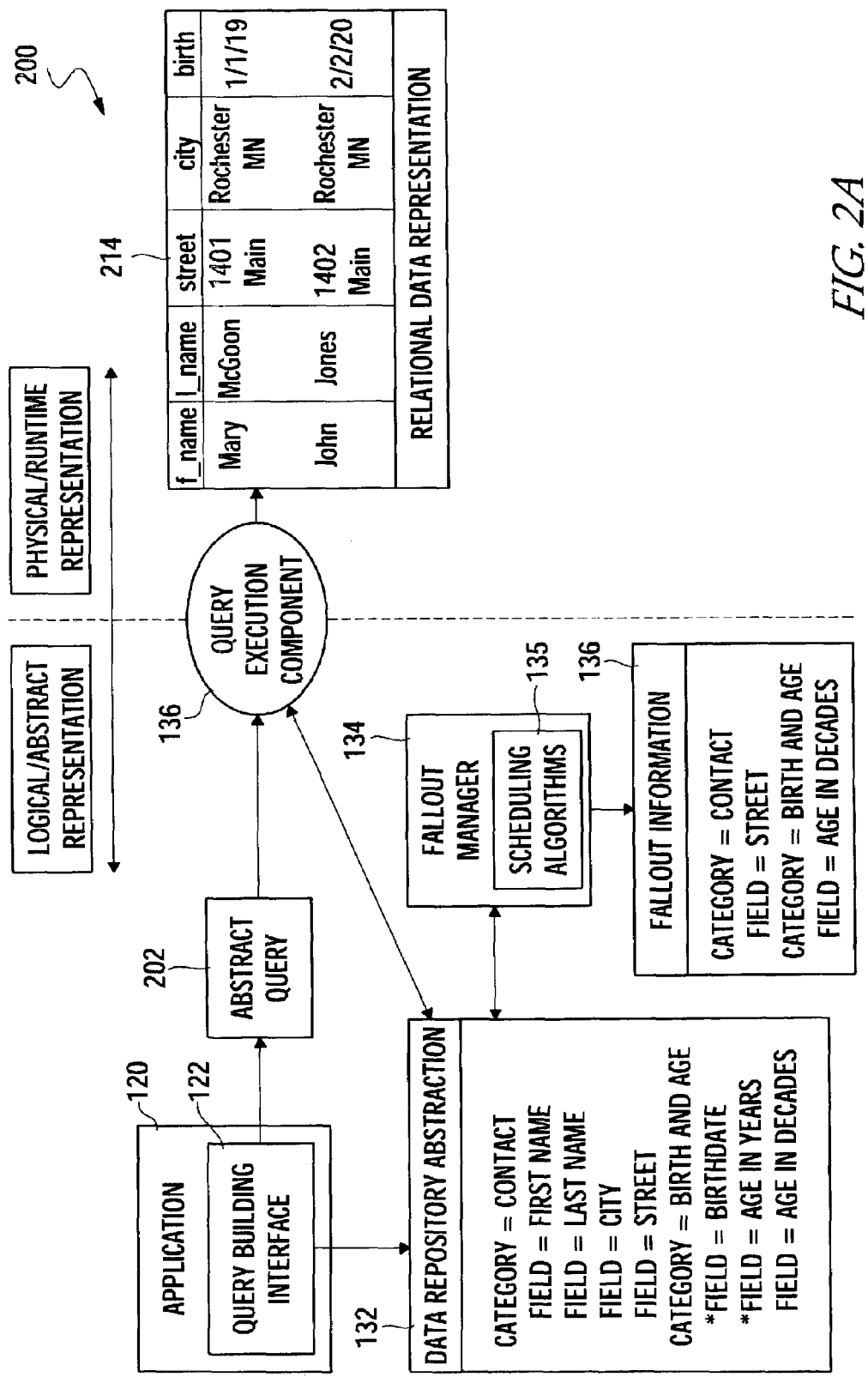
FIG. 2 is a relational view of software components of one embodiment of the present invention.

FIG. 2A illustrates a relational view of the DRA component 132, fallout manager 134, and query execution component 136, according to one embodiment of the invention. As illustrated, the DRA component 132 includes a set of logical fields corresponding to fields in a physical data representation 214. The physical data representation 214 may be a relational data representation (as shown), such as SQL, for example. Regardless of the actual physical data representation, a user may generate, via the query building interface 122, an abstract query 202 including query conditions based on the logical fields of the DRA component 132, in order to access data stored in the physical data representation 214. As illustrated, for some embodiments, logical fields may be organized in categories (e.g., Contacts, Birth and Age Related fields, etc.). The concepts described herein may also be applied to limit the number of categories presented to a user.

The query execution component 136 is generally configured to execute the abstract query 202 by transforming the abstract query 202 into a concrete query compatible with the physical data representation 214. The query execution component 136 may transform the abstract query 202 into the concrete query by mapping the logical fields of the abstract query 202 to the corresponding physical fields of the physical data representation 214, based on mapping information in the DRA component 132. The mapping abstract queries to concrete queries is described in detail in the previously referenced co-pending application Ser. No. 10/083,075.

For example, as illustrated in FIG. 2B, the DRA component 132 may include, for each logical field, table and field names indicating a corresponding physical field in the physical data representation 214. The DRA component 132 may also include, for each logical field, a Boolean HIDDEN attribute to indicate to the query building interface 122 whether the logical field should be hidden (not displayed) and a parameter to store a usage characteristic of the logical field. For example, as shown, a value indicative of the last use of the logical field (e.g., as a number of days) may be stored as the usage characteristic parameter. Alternatively, a time stamp indicative of the last use may be stored in the usage characteristic which may be used to calculate the amount of time has past since the last use from a current time stamp. For some embodiments, usage characteristics may include a frequency with which the logical field is used, for example, as defined by a number of times the logical field has been used in a query for a given period. Further, as will be described in greater detail below, for some embodiments, usage characteristics for individual users may be stored in one or more DRA components 132, allowing for user-specific fallout.

Referring back to FIG. 2A, the fallout manager 134 may decide whether a logical field should partially or completely fallout of the DRA component 132 based on one or more scheduling algorithms 135. The scheduling algorithms 135 may include a set of parameters that determine how and when logical fields should fallout (partially or completely) of the DRA component 132. As illustrated in FIG. 2C, for some embodiments, the scheduling algorithms 135 may include threshold parameters for comparison against the usage characteristic parameters stored in the DRA component 132 to determine fallout.

As illustrated, a first scheduling algorithm may cause logical fields whose last use occurred more than 180 days ago to partially fallout. As a result, BIRTH DATE and AGE IN YEARS fields in the DRA component 132, last used more than 180 days ago, may be marked as hidden (e.g., the HIDDEN attribute may be set to YES). A second scheduling algorithm may cause logical fields whose last use occurred more than 365 days ago to completely fallout. As a result, STREET and AGE IN DECADES fields last used more than 365 days ago may-be removed from the DRA component 132. As illustrated in FIGS. 2A and 2D, the removed fields and the associated parameters may be stored in the fallout information 138.

Fall Out Maintenance

The fallout manager 134 may be generally configured to perform two basic functions: to monitor the query building process to update usage characteristics for logical fields and to maintain (update) the DRA component 132 by allowing logical fields to fall out of the DRA component 132 based on the usage characteristics. For some embodiments, the fallout manager 134 may parse abstract queries 202 issued by the query building interface 122 to determine the logical fields used in constructing the abstract query 202. For other embodiments, the query execution component 136 may send the fallout manager 134 information regarding the logical fields used to construct the abstract query 202. Regardless, the fallout manager 134 may update the usage characteristics stored in the DRA component 132 for each of the logical fields used to construct the abstract query 202.

Figure 3:
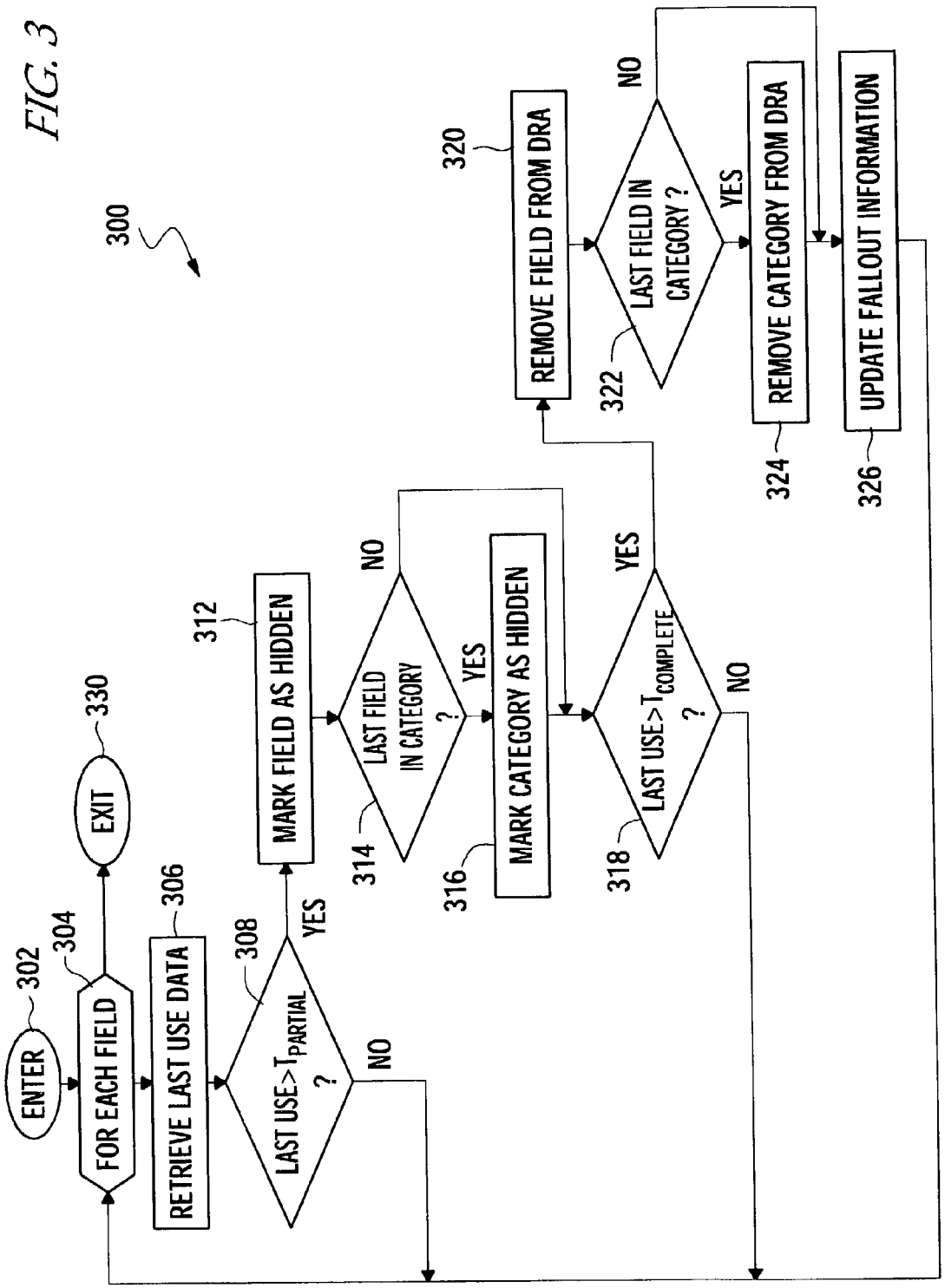
FIG. 3 is a flow chart illustrating exemplary operations for marking as hidden, or removing, fields in accordance with the present invention.

FIG. 3 is a flow diagram of operations 300 that may be performed by the fallout manager 134 for maintaining the DRA component 132. The operations 300 may be described with reference to FIGS. 2A-2D. The operations 300 begin at step 302, for example, in the course of performing periodic maintenance on the DRA component 132 or in response to a request to perform DRA maintenance (e.g., from an administrator). Further, the operations 300 may be performed automatically, for example, prior to invoking the query building interface 122, to update the DRA component 132. Regardless, at step 304, the fallout manager 134 enters a loop of operations (including steps 306-326) performed for each field in the DRA component 132.

At step 306, last use data is retrieved for the selected field. At step 308, the fallout manager 134 determines (based on the last use data) if the field has been used to build a query within a predetermined partial fallout time period ($T_{PARTIAL}$). As previously described, last use data may be stored as a usage characteristic parameter for each field in the DRA. As previously described, the last use data may be stored in any suitable format, such as the actual amount of time that has passed since the field was last used (e.g., in days, as shown) or as a time stamp recorded when the field was last used. Regardless of the format, if the field has been used to build a query within $T_{PARTIAL}$, processing continues to step 304 to select the next field.

On the other hand, if the field has not been used to build a query within $T_{PARTIAL}$, the field is marked as hidden at step 312. For example, the HIDDEN attribute for the field may be set to YES. At step 314, the fallout manager 134 determines if the selected field is the last field in a category (or parent field). If so, the category is marked as hidden, at step 316. For example, while not illustrated in FIG. 2B, the DRA component 132 may also include, for each category, a HIDDEN attribute similar to the HIDDEN attribute of the logical fields. As will be described in greater detail below, the query building interface 122 may determine whether or not to display a field (or category) based on the value of a corresponding HIDDEN attribute.

At step 318, the fallout manager determines if the field has been used to build a query within a predetermined complete fallout time period ($T_{COMPLETE}$). If the field has been used to build a query within $T_{COMPLETE}$, processing continues to step 304 to select the next field.

On the other hand, if the field has not been used to build a query within $T_{COMPLETE}$, the field is removed from the DRA component 132, at step 320. At step 322, the fallout manager determines if the selected field (removed from the DRA in step 320) was the last field in a category remaining in the DRA component 132. If so, the category is removed from the DRA component 132, at step 324. At step 326, the fallout information 138 is updated and processing continues to step 304 to select the next field for processing. Once all the fields have been processed, the operations 300 are exited at step 330.

As illustrated in FIG. 2D, the fallout information 138 may contain all the information regarding the removed fields, that was previously contained in the DRA component 132. An advantage to this approach is that the removed fields may be restored to the DRA component 132 from the fallout information 138, for example, upon request of a database administrator. Another advantage to this approach is that the last use data may continue to be updated even after a field is removed. Accordingly, if a scheduling algorithm is changed (or a different scheduling is used), resulting in a greater complete fallout time, removed fields that were last used prior to the greater complete fallout time may be automatically restored.

Of course, the particular operations 300 illustrated and the particular order of the operations 300 is for illustrative purposes only, and may be modified in various ways. For example, for some embodiments, usage characteristics of a field may be tested for complete fallout prior to testing for partial fallout. As another example, for some embodiments, fallout processing may not be performed on categories (i.e., steps 314-316 and steps 322-324). For example, for some embodiments, fields may not be organized in categories.

Query Building Interface

The impact of field fallout from a user's perspective is illustrated in FIGS. 4A and 4B, which show an exemplary GUI screen 530 for adding search conditions to a query based on fields from the DRA component 132, without and with hidden fields shown, respectively. The GUI screen 530 for adding search conditions may be accessed, for example, from a main query building GUI screen of the query building interface 122. Of course, the GUI screen 530 of FIGS. 4A and 4B illustrate only one embodiment of the present invention, and many different variations of suitable GUI screens may allow a user to add search conditions to a query within the scope of the present invention. For illustrative purposes only, the FIGS. 4A and 4B will be described with reference to building queries to a database containing fields related to the medical industry. Of course, similar GUI screens may be created for building queries to databases containing fields related to any industry.

The GUI screen 530 may present to the user fields for use in constructing search conditions to be added to a query being built. As illustrated, the GUI screen 530 may present the fields within a set of categories. The set of categories may depend on the industry for which the database is established. For example, for a medical industry database application, the list of categories may include a BIRTH AND AGE RELATED category 532, a LABARATORY RESULTS category 534, a REPORTS category 536, and a DIAGNOSTIC CODE category 538 (as illustrated, the DIAGNOSTIC CODE category 538 may allow a user to enter government mandated ICD-9 diagnostic codes). Each of the categories may have a list of related fields (or related subcategories with related fields).

For example, the BIRTH AND AGE RELATED category 532 may include fields for AGE, BIRTH DATE, and AGE IN DECADES. To construct a query condition based on one of the fields, the end user may select one of the fields (e.g., from a pull down menu). In response to selecting one of the fields, the user may be presented with another GUI screen (not shown) allowing the user to specify a query condition based on the selected field. For example, one such GUI screen may allow the user to enter an age related search condition by specifying a logical operator and a number of years (e.g., AGE>40). Of course, age is typically not stored in a database, but rather calculated from a birth date and current date. However, the query building interface 122 may hide this detail from a user, greatly facilitating the entry of age related conditions.

As previously described, a user may be given the option of displaying hidden fields. For example, the GUI screen 530 may include a SHOW HIDDEN FIELDS check box 544. With the check box 544 unchecked (i.e., SHOW HIDDEN FIELDS disabled), in FIG. 4A, hidden fields are not presented to the user. For example, a hidden field AGE IN DECADES is not presented in the pulldown menu for the BIRTH AND AGE RELATED categories 532, and a hidden CONTACTS category 539 (i.e., a category with only hidden fields) is not displayed. As illustrated in FIG. 4B, however, with the check box 544 checked, the hidden fields (i.e., AGE IN DECADES and the fields of the hidden category CONTACTS) are presented to the user, for example, regardless of the value of the corresponding HIDDEN attributes.

It should be noted, however, that fields that were removed from the DRA component 132 (i.e., fields that fell out completely) are not displayed regardless of whether the check box 544 is checked or not. However, as previously described, removed fields may be restored (based on the fallout information 138) to the DRA component 132. For some embodiments, the removed fields may be restored to the DRA component 132 as hidden or unhidden (e.g., by initializing the corresponding HIDDEN attribute accordingly).

Figure 5A:
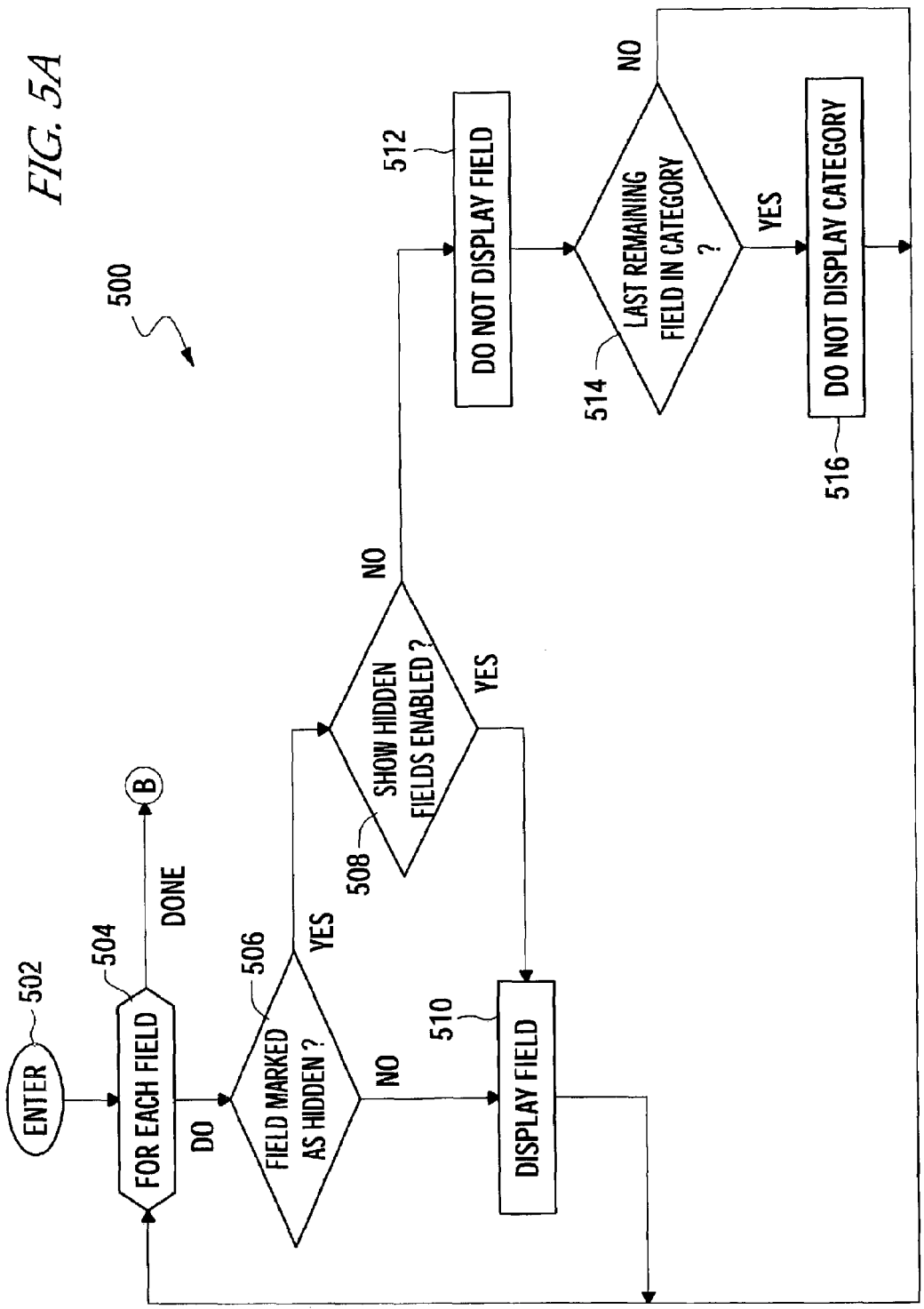
FIGS. 5A-5B are flow charts illustrating exemplary operations for limiting the number of fields presented to a user and updating usage characteristics of fields, respectively, in accordance with the present invention.
Figure 5B:
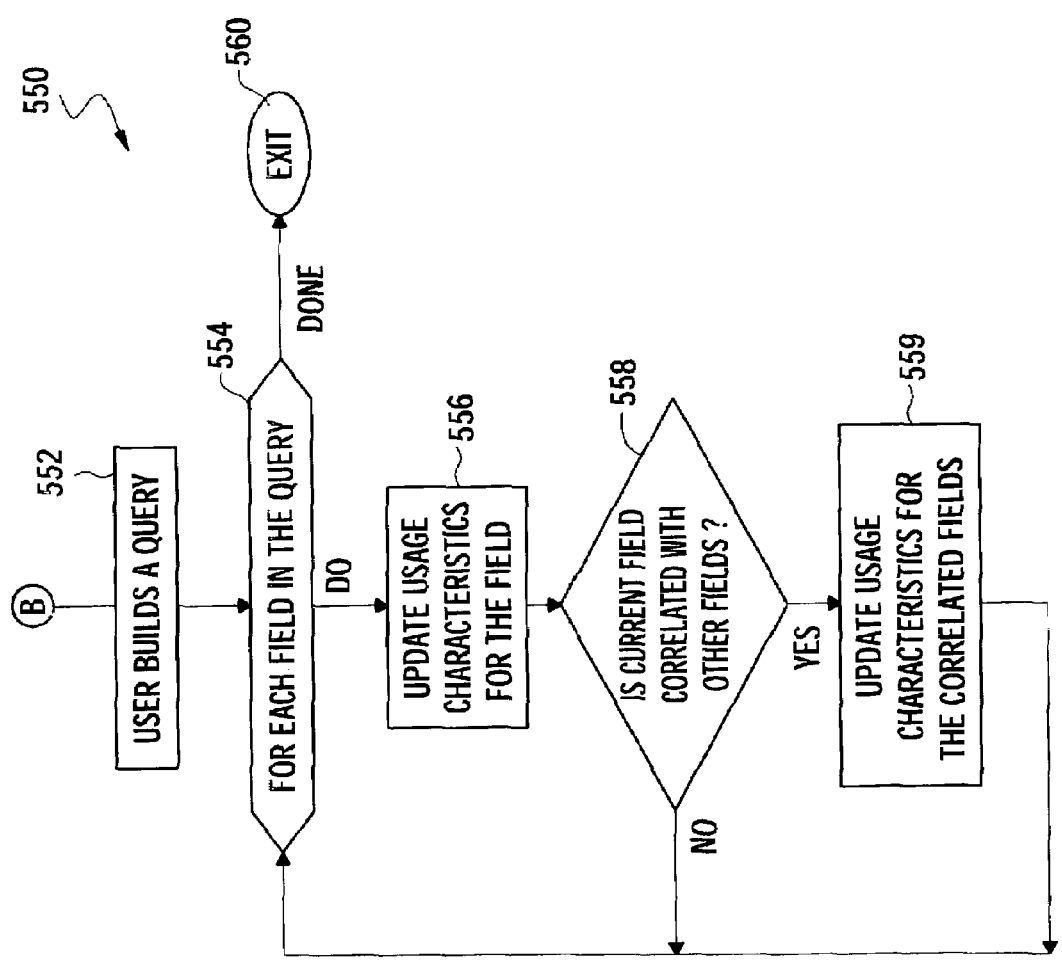

FIGS. 5A and 5B are flow diagrams of operations 500 and 550, respectively, that may be performed as part of the query building process. The operations 500 may be performed, for example, by the query building interface 122, to limit the number of fields presented to a user, for example, in an effort to simplify the query building process. The operations 550 may performed during normal query building and execution process, for example, by the fallout manager 134, to continuously update usage characteristics of fields in the DRA component 132.

The operations 500 begin at step 502, for example, when building a GUI screen (such as the GUI screen 530 of FIGS. 4A and 4B) to present fields to the user for use in adding search conditions, or as an initialization routine to identify fields to be displayed at a later time. At step 504, a loop of operations (steps 506-516) are performed for each field in the DRA component 132 is entered, to determine which of the fields should be presented to the user. At step 506, a determination is made of whether a selected field is marked as hidden. For example, the determination may be made by testing the Boolean hidden parameter for the field in the DRA component 132. If the field is marked as hidden, a determination is made, at step 508, whether the user has requested that hidden fields be shown (e.g., via the check box 544 of the GUI 530). If either the field is not marked as hidden or the user has requested that hidden fields be shown, the field is displayed at step 510 (or added to a list of fields to be displayed) and processing continues to step 504 to select the next field.

If, on the other hand, the field is marked as hidden and the user has not requested hidden fields to be shown, the field is not displayed at step 512 (or the field is not added to the of fields to be displayed). Optionally, at step 514, a determination is made of whether the field is the last field in a category (i.e., all other fields in the category are also hidden). If so, the category is not displayed, at step 516, and processing continues to step 504 to select the next field.

As previously described with reference to FIG. 3, categories may also be marked as hidden during fallout processing by the fallout manager 134. For example, each category may have a Boolean hidden parameter that may be tested to determine if the category is hidden. Therefore, rather than make the determination of step 514, a determination may be made of whether the category is hidden or not. Of course, this determination may be made in an outer loop (not shown), such that the operations 504-510 are not performed for fields of hidden categories.

Once it has been determined which fields (or categories) are to be displayed, processing proceeds from step 504 to the operations 550 of FIG. 5B for updating usage characteristics of fields, by the fallout manager 134, during the query building and/or execution process. The operations 550 begin at step 552 when a user builds a query. For some embodiments, the fallout manager 134 may receive the query from the query building interface 122 when a user chooses to execute a query. For other embodiments, rather than receive the query, the fallout manager 134 may receive a list of fields used in the query from the query execution component 136. Regardless, at step 554, the fallout manager 134 enters a loop of operations (including steps 556-559) performed for each field in the query. At step 556, the usage characteristics (e.g., last use or frequency of use) for a selected field is updated. For example, the last use parameter for the selected field may be updated in the DRA component 132.

For some embodiments, related fields may be correlated, such that the usage characteristics of the correlated fields are updated together. Fields may be correlated if, for example, the use of one of the fields increases the likelihood of the use of another one of the fields. Accordingly, when the usage characteristics of one field is updated, the usage characteristics of any correlated fields may also be updated. Therefore, at step 558, a determination is made whether the selected field is correlated with other fields. If the selected field is not correlated with other fields, processing proceeds to step 554 to select the next field. If the selected field is correlated with other fields, the usage characteristics of the correlated fields are updated, at step 559, and processing proceeds to step 554 to select the next field. Once the usage characteristics for each field in the query (and any correlated fields) have been updated, the operations are exited at step 560.

User-Specific Fallout

As previously described, for some embodiments, usage characteristics may be maintained for individual users. Thus, for example, the operations 550 may be performed to update usage characteristics for a particular user. In other words, the fallout manager 134 may maintain user-specific usage characteristics for fields in the DRA component 132, and logical fields may be marked as hidden from specific users (i.e., rather than "globally" hidden from all users). For some embodiments, a separate DRA component 132 may be provided for each user and the fallout manager 134 may maintain and access a separate DRA component 132 to perform fallout for each user. For other embodiments, a global DRA component 132 may include logical fields with separate usage characteristics for each user in a system.

Regardless, the operations 500 may be performed to determine which fields are displayed for (or hidden from) a particular user based on the usage characteristics corresponding to the particular user. Thus, different users (running the query building interface 122) may be presented with correspondingly different logical fields, based on their individual usage characteristics. In other words, by performing user-specific fallout, one or more logical fields presented to one user may not be presented to another user. User-specific fallout may have the highly desirable result that (eventually) logical fields that are not interesting to a particular user may be hidden from that particular user, without being hidden from other, possibly interested users.

As an example, two medical researchers, Researcher A and Researcher B may perform research relating to different families of diseases, for example, heart disease and liver disease, respectively. Accordingly, Researcher A may build queries with conditions based on logical fields related to heart disease, but not liver disease, while Researcher B may build queries with conditions based on logical fields related to liver disease, but not heart disease. Due to user-specific fallout, logical fields related to liver disease may (eventually) not be presented to Researcher A, despite the fact that Researcher B may regularly build queries related to liver disease. Similarly, logical fields related to heart disease may (eventually) not be presented to Researcher B despite the fact that Researcher A may regularly build queries related to heart disease. Of course, logical fields that are not used by either researcher may eventually fallout with respect to both, and may, therefore, not be presented to either.

Thus, by performing user-specific fallout, the query building process for Researcher A and Researcher B may be simplified by limiting, independently, the logical fields presented to each. In a similar manner, user-specific scheduling algorithms may also be utilized. For example, the fallout manager 134 may perform DRA maintenance (e.g., operations 300 of FIG. 3) based on scheduling algorithms specific to particular users. For some embodiments, users may be able to control the rate with which logical fields fallout by adjusting scheduling algorithms. For example, one user may reduce a fallout period of a scheduling algorithm to allow logical fields to fallout rapidly (e.g., LAST USE=50 days), while another user may increase a fallout period to allow logical fields to fallout gradually (e.g., LAST USE=100 days).

CONCLUSION

By limiting the number of fields presented to a user based on usage characteristics of the fields, the query building process may be greatly simplified. The number of fields presented to the user may be limited by marking fields as hidden and/or removing fields from a data repository abstraction. It should be noted that any reference herein to particular values, definitions, programming languages and examples is merely for purposes of illustration. Accordingly, the invention is not limited by any particular illustrations and examples. For example, while aspects of the present invention have been described with reference to an abstract data model (utilizing a data repository abstraction component containing logical fields), the aspects may also be applied with advantage to conventional data models having fields corresponding to a particular physical representation. In other words, any type of query building interface may be simplified by limiting the number of fields presented to a user, regardless of the underlying data model.

While the foregoing is directed to embodiments of the present invention, other and further embodiments of the invention may be devised without departing from the basic scope thereof, and the scope thereof is determined by the claims that follow.

What is claimed is:

1. A database system comprising:
    a database comprising data having a particular physical representation;
    a data repository abstraction layer comprising logical fields corresponding to physical entities of the database;
    a query building interface allowing a user to build a query to access the database by specifying query conditions based on the logical fields; and
    a fallout manager configured to control the logical fields presented to the user by the query building interface based on usage characteristics of the logical fields in building queries, wherein the usage characteristics comprise an indication of at least one of: when a logical field was last used in building a query and a frequency with which the logical field has been used in building queries,
    wherein the fallout manager is configured to control the logical fields presented by the query building interface by hiding logical fields not used in building a query within a first predetermined period of time.

2. The database system of claim 1, wherein the fallout manager is configured to control the logical fields presented by the query building interface to a particular user based on usage characteristics of the logical fields in building queries by the particular user.

3. The database system of claim 2, wherein the data repository abstraction layer further comprises a plurality of usage characteristics, each specific to a particular user, for one or more of the logical fields.

4. The database system of claim 1, wherein the logical fields in the data repository abstraction layer comprise a set of correlated logical fields and the fallout manager is configured to update usage characteristics of each of the correlated logical fields upon detecting a query has been built using any of the set of correlated logical fields.

5. The database system of claim 1, wherein the fallout manager is further configured to control the logical fields presented by the query building interface by removing, from the data repository abstraction layer, logical fields not used in building a query within a second predetermined period of time greater than the first predetermined period of time.

6. The database system of claim 5, wherein hiding a logical field comprises modifying a parameter associated with the logical field in the data repository abstraction layer.

7. The database system of claim 1, wherein the query building interface provides a user the option of displaying previously hidden logical fields.

* * * * *